(12) United States Patent
Sakoda

(10) Patent No.: US 6,909,704 B2
(45) Date of Patent: *Jun. 21, 2005

(54) COMMUNICATION SYSTEM THAT REJECTS CONNECTIONS BASED ON TOTAL TRANSMISSION ENERGY

(75) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 902 days.

This patent is subject to a terminal disclaimer.

(21) Appl. No.: 09/798,582

(22) Filed: Mar. 2, 2001

(65) Prior Publication Data

US 2001/0046213 A1 Nov. 29, 2001

(30) Foreign Application Priority Data

Mar. 3, 2000 (JP) .................................... P2000-059028
May 11, 2000 (JP) .................................... P2000-139043

(51) Int. Cl.$^7$ ............................................. H04B 7/216
(52) U.S. Cl. ....................... 370/335; 370/342; 455/522
(58) Field of Search ............................... 370/311, 335, 370/342; 455/522

(56) References Cited

U.S. PATENT DOCUMENTS

| 6,307,844 B1 | * | 10/2001 | Tsunehara et al. | 370/318 |
| 6,496,706 B1 | * | 12/2002 | Jou et al. | 455/522 |
| 6,603,752 B1 | * | 8/2003 | Saifuddin et al. | 455/522 |
| 6,633,552 B1 | * | 10/2003 | Ling et al. | 370/335 |
| 2002/0064135 A1 | * | 5/2002 | Chen et al. | 370/252 |

* cited by examiner

Primary Examiner—Kenneth Vanderpuye
Assistant Examiner—Feben Micael Haile
(74) Attorney, Agent, or Firm—Jay H. Maioli

(57) ABSTRACT

When a base station and a plurality of terminal stations communicate with each other by radio, power control information for controlling electric power of a signal transmitted to the base station is multiplexed at the base station and transmission energy is adjusted such that total transmission energy of the multiplexed power control information becomes substantially a predetermined value if the total transmission energy of the multiplexed power control information is lower than a predetermined value. Therefore, information such as power control information that should be individually instructed to respective terminal stations can satisfactorily be transmitted by a simple arrangement and a simple processing.

15 Claims, 12 Drawing Sheets

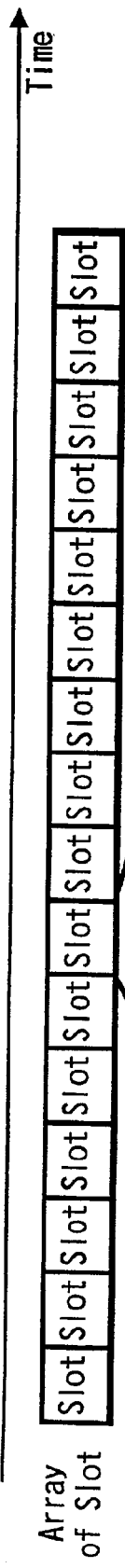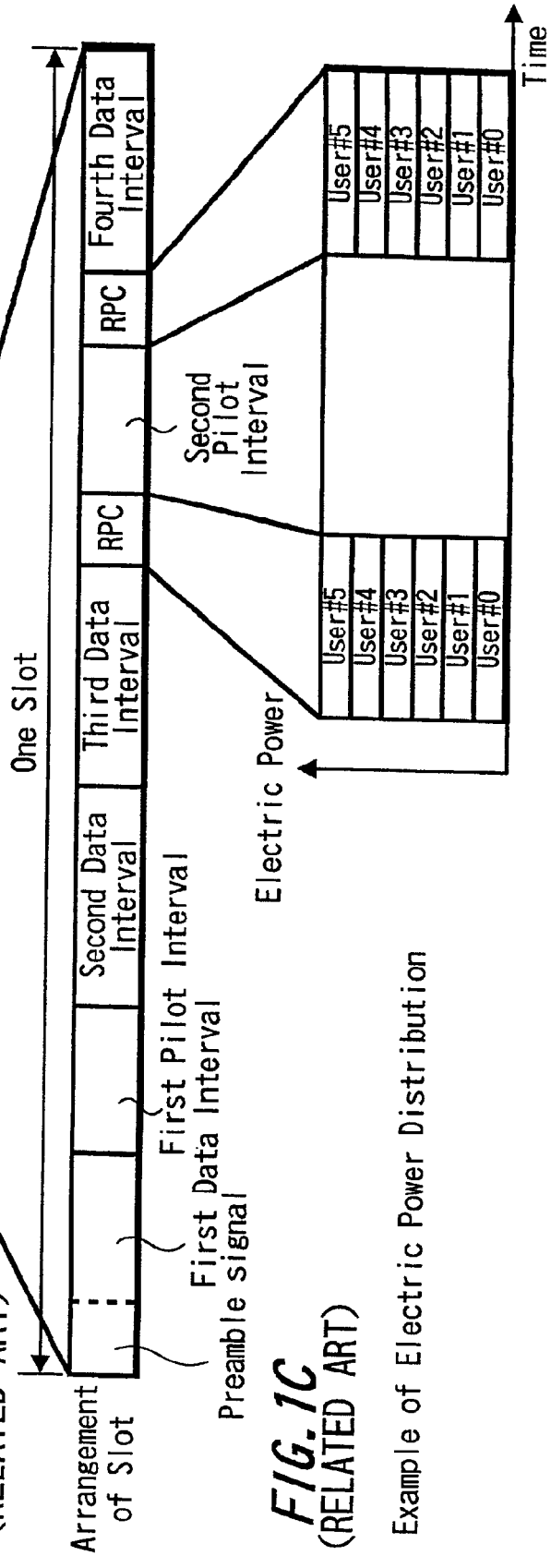

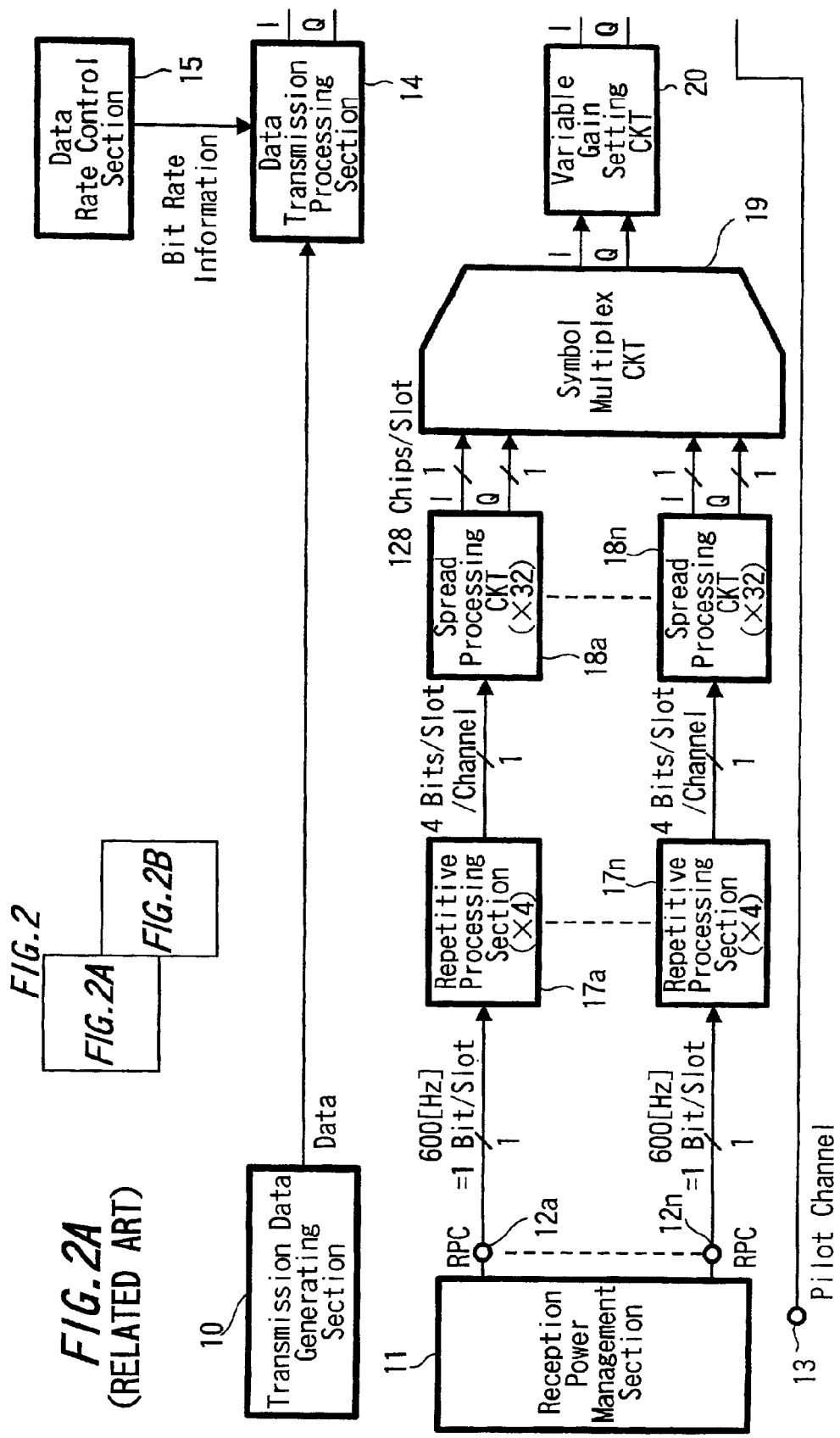

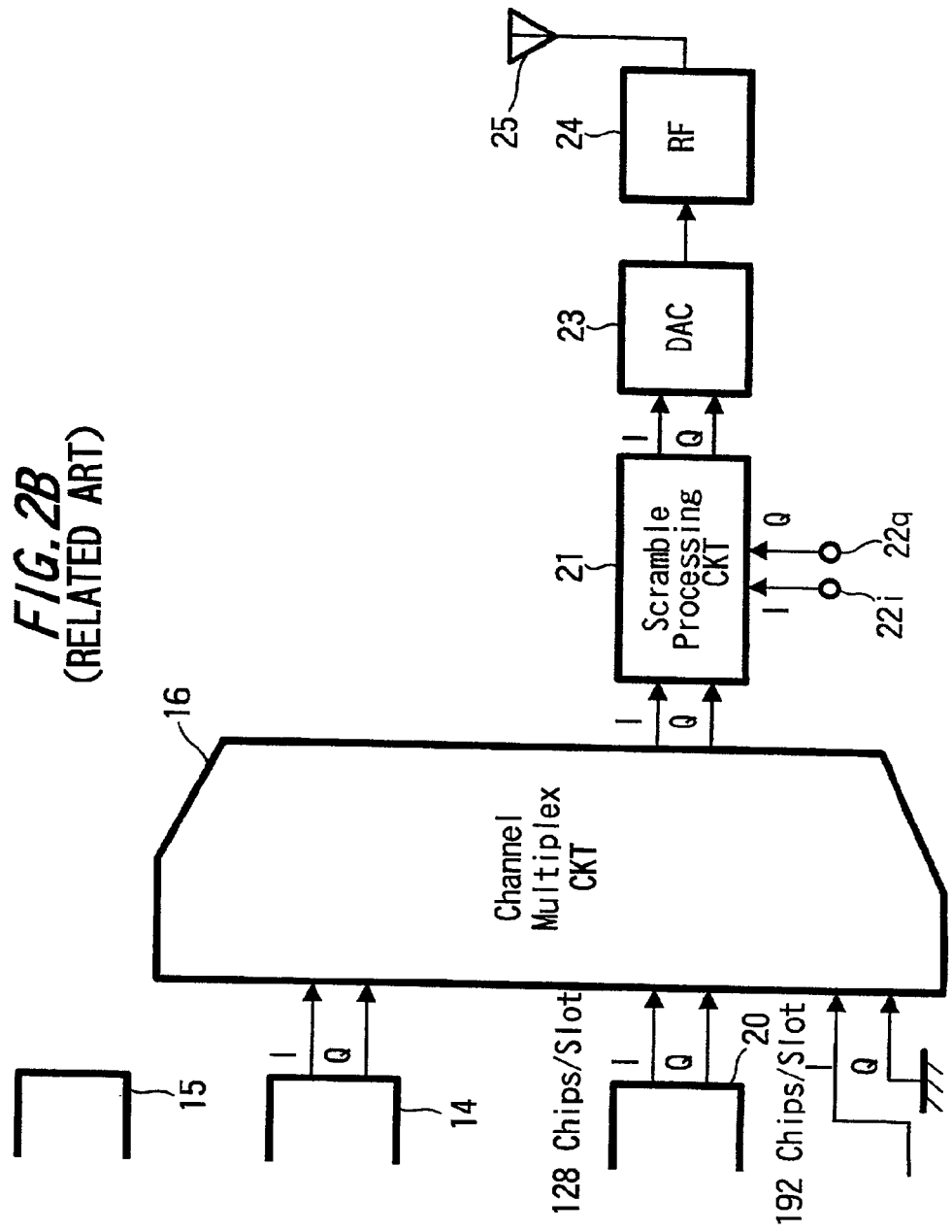

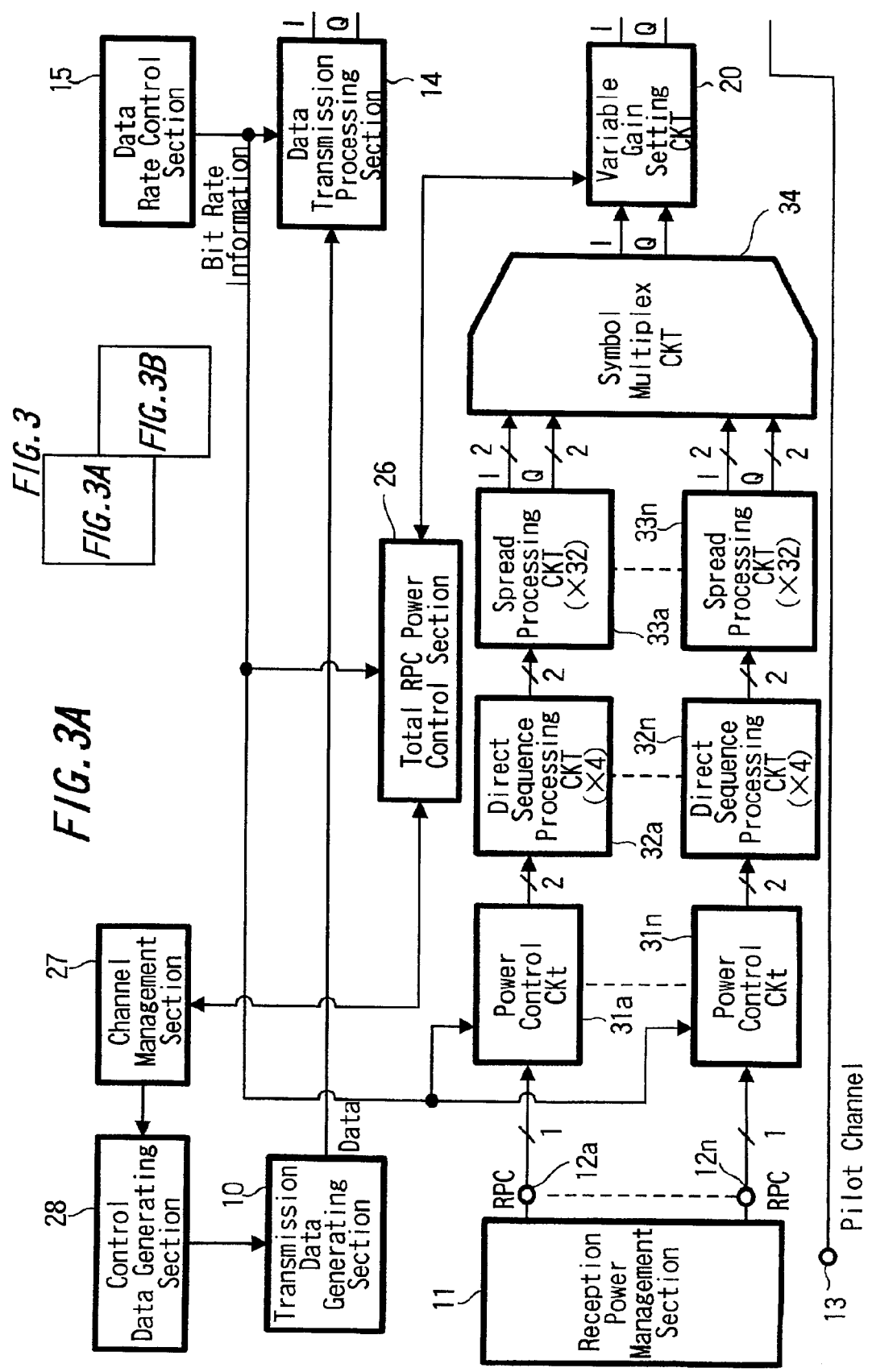

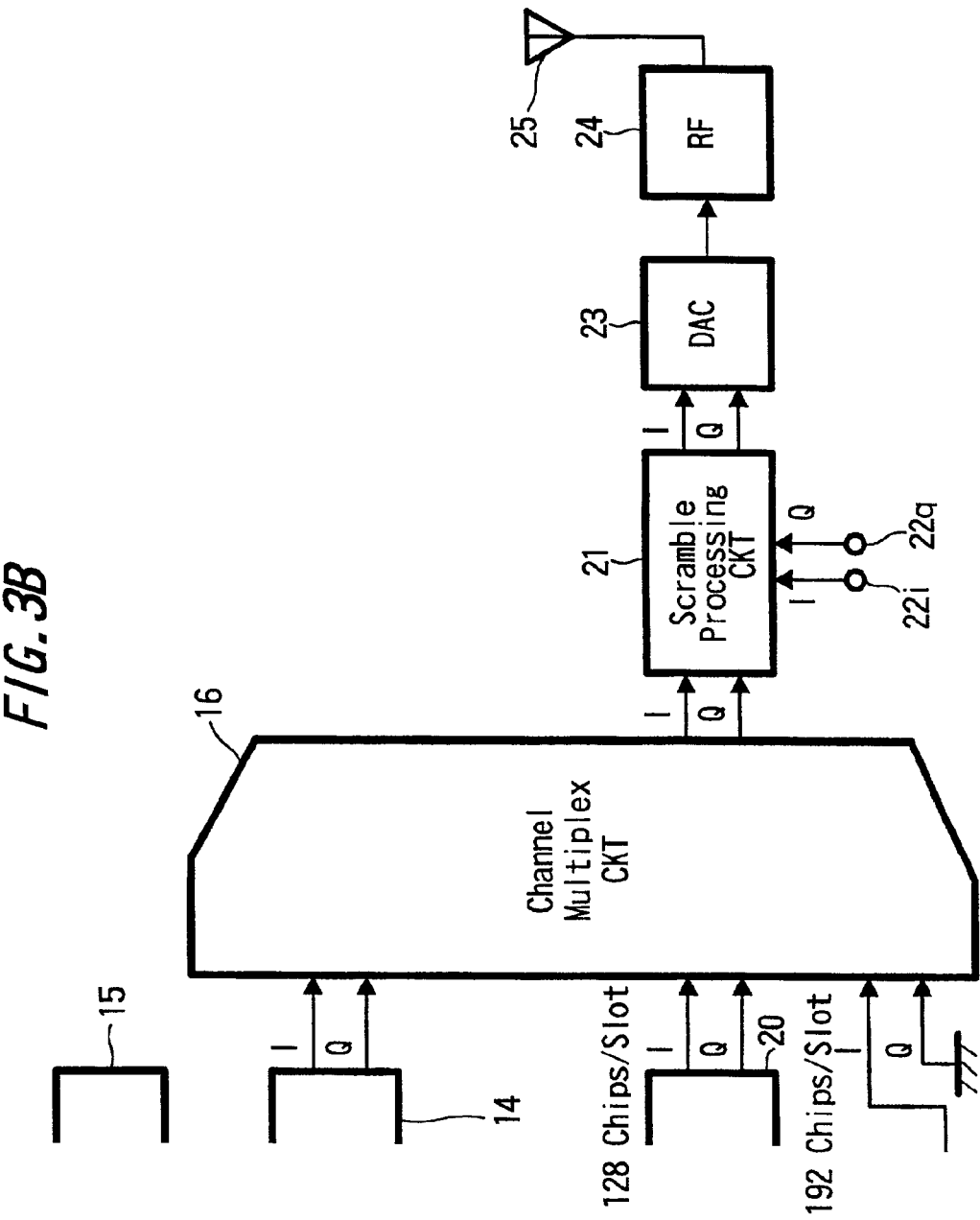

A Portion of Slot Arrangement

Example of Electric Power Distribution

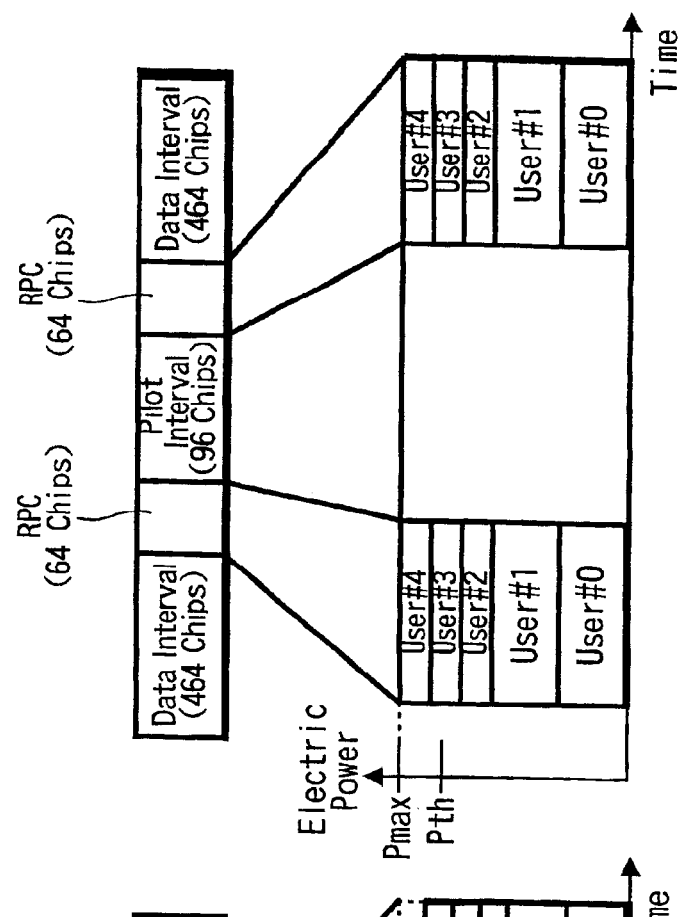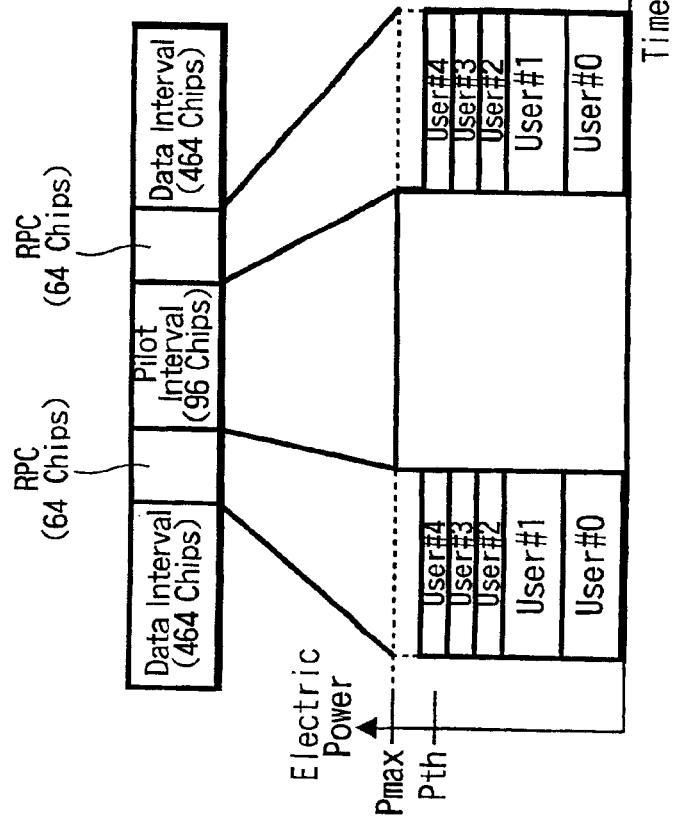

COMMUNICATION SYSTEM THAT REJECTS CONNECTIONS BASED ON TOTAL TRANSMISSION ENERGY

BACKGROUND OF THE INVENTION

1. Field of the Invention

The present invention generally relates to a communication system and a communication method suitable for use for a cellular wireless communication system and a communication apparatus for use in a base station of this communication system. More particularly, this invention relates to a communication system, a communication method and a communication apparatus suitable for use in a system which transmits a CDMA (code division multiple access) signal by radio, for example.

2. Description of the Related Art

There is proposed a digital cellular wireless communication system for effecting a data communication between a base station and a plurality of terminal stations, in which down-link communications are transmitted from the base station to the terminal stations with a frame arrangement shown in FIGS. 1A and 1B. This digital cellular wireless communication system shows an example of a transmission arrangement of a system called an HDR (high data rate). FIG. 1A is a diagram showing a frame arrangement in which slots of a unit length are located continuously. FIG. 1B shows an arrangement of one slot in which there are disposed a first data interval, a first pilot interval, a second data interval, a third data interval, a first power control information interval, a second pilot interval, a second power control information interval and a fourth data interval, in that order. In FIG. 1B, each power control information interval is shown as RPC for simplicity.

As shown in FIG. 1B, a preamble signal is disposed at a part of the starting portion of the first data interval. Data within the preamble signal indicates a terminal station to which the data within the slot is transmitted. The first to fourth data intervals are set to be of the same duration. To be concrete, the first to fourth data intervals are respectively set to be 464 chips, the first and second pilot intervals are respectively set to be 96 chips, the first and second power control information intervals are set to be 64 chips, respectively, and the length of one slot is set to be 2176 chips, for example.

In the case of this digital cellular wireless communication system, a data interval within one slot is allocated as an interval for transmitting data to one terminal station. Accordingly, when data should be transmitted from the base station to a plurality of specific terminal stations, a plurality of terminal stations, for example, transmit data by sequentially using one slot each. The power control information intervals (RPC) located ahead of and behind the second pilot interval individually transmit power control information to respective terminal stations which are communicating with the base station. The pilot interval is fundamentally the interval in which data is received by all terminal station. This power control information is data for designating a transmission electric power of an up-link through which data is transmitted from each terminal station to the base station and instructs individual terminal stations either to increase a transmission power or decrease a transmission power.

In order to simultaneously and individually transmit the power control information to individual terminal stations, in the proposed system according to the related art, power control information for each terminal station is spread by using a code allocated to every terminal station and the power control information thus spread for each terminal station are multiplexed and then transmitted. The processing in which a plurality of data thus spread by using the code corresponds to a CDMA (code division multiple access) system processing.

FIG. 1C is a diagram showing the manner in which power control information is transmitted in the first and second power control information intervals. In this example, power control information is simultaneously transmitted to six terminal stations of users #0 to #5, and power control information for six terminal stations are held at the same transmission electric power, spread, multiplexed and then transmitted.

Transmission electric powers of all signals transmitted from the base station during each slot period are set at the same value (fixed value), and the total transmission electric powers of the power control information transmitted during the first and second power control information intervals also are set to be this fixed value. Accordingly, as shown in FIG. 1C, for example, when the power control information is simultaneously transmitted to the six terminal stations, a transmission electric power of each power control information becomes ⅙ of the fixed value. While the power control information to the six users #0 to #5 are illustrated in the state that they are simply added for simplicity in the example shown in FIG. 1C, in actual practice, the power control information that has been spread by using the code is added.

In the case of this digital cellular wireless communication system, a modulation system and a coding rate of data transmitted from the base station during the data interval is adaptively set in response to the communication state between the base station and the terminal station of the called party so that even the arrangement in which the transmission electric power is fixed as described above can cope with the change of the wireless communication state between the base station and the terminal station.

FIG. 2 (formed of FIGS. 2A and 2B drawn on two sheets of drawings to permit a use of a suitably large-scale) is a block diagram showing an example of an arrangement of a transmission system of a base station for transmitting data to each terminal station with the arrangement of the frame shown in FIGS. 1A and 1B, for example. As shown in FIG. 2, there is provided a transmission data generating section 10 which is a circuit for generating data transmitted to a terminal station. A reception power management section 11 is a circuit for generating power control information transmitted to the terminal stations. Power control information to individual terminal stations are supplied to separate terminals (these terminals will hereinafter be referred to as "power control information input terminals") 12a to 12n. A pilot channel input terminal 13 is a terminal to which pilot data is supplied from a pilot data setting circuit (not shown).

Transmission data generated from the transmission data generating section 10 is supplied to a data transmission processing section 14, in which it is subjected to processings for transmission such as transmission coding processing, modulation processing and interleave processing. The data processed herein is data located in the first to fourth data intervals of the slot arrangement shown in FIGS. 1A and 1B, and the preamble data located at the starting portion of the first data interval also is processed. Since data allocated in the first to fourth data intervals are fundamentally allocated to one terminal station by the slot unit as earlier noted, during a period in which data of one slot is processed, the coding system and the modulation system suited for the terminal station for effecting a communication in that slot are set by the data transmission processing section 14 and the transmission processing is executed.

The coding system and the modulation system suitable for the terminal station are set based on bit rate information supplied from a data rate control section 15 to the data transmission processing section 14. To be concrete, when data which is to be transmitted to a terminal station of which communication state (receiving situation at the terminal station) is satisfactory is transmitted, transmission data is coded by a multivalued modulation such as a 16QAM (16-quadrature amplitude modulation) and a high coding rate and transmitted at a high throughput. When transmission data which is to be transmitted to a terminal station whose communication state is not satisfactory is transmitted, transmission data is coded at a low coding rate and a QPSK (quadrature phase shift keying)-modulated signal is spread or transmitted a plurality of times and thereby transmitted at a low throughput. Transmission data (I-channel data and Q-channel data) processed by the data transmission processing section 14 are supplied to a channel multiplex circuit 16.

Power control information supplied to the power control information input terminals 12a to 12n are information prepared individually at a plurality of terminal stations with which the base station communicate in the same period, and individual information is separately supplied to the power control information input terminals 12a to 12n at every terminal station. Accordingly, power control information are generated and supplied in response to the number of terminal stations which communicate with the base station in the same period. Power control information supplied to one terminal station is 1-bit information per slot. Such 1-bit information is used to instruct the corresponding terminal station to increase transmission electric power or to decrease transmission electric power.

Respective power control information obtained by the power control information input terminals 12a to 12n are supplied to repetitive processing sections 17a to 17n, in which each 1-bit data is broken into four-times data, i.e., 4-bit data in which 1-bit data is repeated four times. The 4-bit power control information per slot are respectively supplied to respective spread processing circuits 18a to 18n, in which they are spread and modulated into data having a predetermined-time bit rate (bit rate of 32 times) by using a predetermined code (e.g., Walsh Code) set at every terminal station and thereby I-channel power control information and Q-channel power control information are obtained. Since the 4-bit data is spread by 32 times, there may be obtained data having a data rate of 128 chips/slot.

The data spread and modulated by the respective spread processing circuits 18a to 18n are supplied to a symbol multiplex circuit 19, in which they are mixed into signals of one system. The signals thus mixed are supplied to a variable gain setting circuit 20. The variable gain setting circuit 20 adjusts the gains of the mixed power control information in a way that the gains may become constant values. Specifically, in the case of this example, the gain of the signal transmitted from the base station is a predetermined constant value. The number of data which are multiplexed by the symbol multiplex circuit 19 is changed in response to the number of terminal stations which are communicating with the base station at that time. Therefore, in response to the number of data multiplexed by the symbol multiplex circuit 19, the variable gain setting circuit 20 generates a signal having a constant gain by adjusting the gain of the transmission signal. The signals whose gain has been adjusted by the variable gain setting circuit 20 are supplied to a channel multiplex circuit 16.

Pilot data obtained by a pilot channel input terminal 13 are all null data and hence supplied to the channel multiplex circuit 16 as they are.

The channel multiplex circuit 16 multiplexes the respective signals supplied thereto in a time-division manner such that the slot arrangement shown in FIG. 1B may be obtained. The signals thus multiplexed in a time-division manner by the channel multiplex circuit 16 are supplied to a scramble processing circuit 21. The scramble processing circuit 21 is supplied with spread codes of both I-channel and Q-channel set for the base station from terminals 22i, 22q and spreads data by using these spread codes. The spread transmission signals of the I-channel and Q-channel are supplied to a digital-to-analog (D/A) converter 23, in which they are converted from digital data into analog data. The analog transmission signal is supplied to a high-frequency (radio-frequency) circuit 24, in which it is processed as a high-frequency signal and thereby converted into a signal having a predetermined transmission frequency channel. Then, the signal having the converted transmission frequency is supplied to an antenna 25, from which it is transmitted to each terminal station by radio.

Since the transmission signal is transmitted from the base station to each terminal station as described above, the base station is able to individually communicate with respective terminal stations at the unit of slots and is able to simultaneously transmit the power control information for instructing the transmission state of each terminal station to all terminal stations at every slot. With respect to the wireless transmission of up-link information from each terminal station to the base station, the transmission electric power can properly be set based on the power control information transmitted from the base station and the base station can satisfactorily receive the signal from each terminal station. With respect to the wireless transmission of down-link information from the base station to each terminal station, since the coding ratio and the modulation system are set adaptively although the transmission power is fixed to the constant value, the transmission signal can be satisfactorily received by any terminal station. Specifically, if each terminal station is a mobile station, then although a distance or a communication state between each terminal station and the base station is changed at any time, the above processing is effected on the transmission signals of up-link information and down-link information respectively, whereby the transmission processing following the change of the distance or the communication state is set adaptively so that wireless communication can constantly be carried out satisfactorily.

Since the power control information multiplexed and simultaneously transmitted are spread by an individual code at every terminal station and transmitted, each terminal station can receive only its own power control information by despreading the received signal with the code allocated thereto, and hence each terminal station can receive power control information properly.

In the above transmission system, let it be assumed that many users (terminal stations) want a connection at the same time. At that time, since the traffic channel of down-link transmitted from the base station is adapted to be shared by a plurality of users, many users can be accommodated by decreasing a time occupying ratio per user from a principle standpoint. With respect to the traffic channel of up-link transmitted from the terminal station, if the transmission electric power is decreased by decreasing the transmission bit rate per user, then the time occupying ratio can be decreased and hence the number of users can be increased. If a communication between the base station and the terminal station is data communication, then data transmission periods are generated in a burst fashion and hence there occurs a time zone in which there exists no transmission data even though the connection is established. Accordingly, there frequently occurs the situation in which one base station accommodates many terminal stations whose connections are established between them and the base station.

In the above transmission channel, if the number of users having connections established increases, electric power distributed to power control information (PC information) per channel decreases. The reason for this is as follows:

An electric power distributed to power control information per channel, for example, is expressed as:

[Electric power of PC information per channel (connection)]=total transmission electric power/number of connections Further, in order that interference by a terminal station accommodated in an adjacent cell comprised of another base station can be controlled, (with respect to a terminal station which will become a large interference source terminal station), power control information should be transmitted to a terminal station which does not transmit and receive data between it and its own station. Consequently, since one terminal station monopolizes power control information intervals of transmission signals of a plurality of base stations, there should be provided more power control information transmission channels than the number of the accommodated terminal stations.

In this case, since [Electric power of PC information per channel (connection)]=total transmission power/number of channels in power control information interval and [number of channels in power control information]>[number of connections] are established, there are required more channels of the power control information intervals.

If the number of accommodated connections increases excessively, then the number of transmitted control information increases in response thereto and transmission electric power of control information distributed to one channel decreases. As a result, when the terminal station receives power control information, there arises a problem that the terminal station cannot receive the power control information correctly because of a shortage of electric power. If the terminal station becomes unable to correctly receive the power control information, then a receiving electric power at the reception side of the up-link cannot be kept constant. As a consequence, it is unavoidable that a quality of an up-link network line is degraded.

SUMMARY OF THE INVENTION

In view of the aforesaid aspect, it is an object of the present invention to provide a communication system, a communication method and a communication apparatus in which information such as power control information that should be individually instructed to respective terminal stations can satisfactorily be transmitted to all terminal stations by simple arrangement and simple processing.

According to an aspect of the present invention, there is provided a communication system in which a base station and a plurality of terminal stations communicate with each other by radio. This communication system is comprised of a base station which is comprised of data processing means for processing data transmitted to each of the terminal stations, power control information processing means for individually generating and multiplexing power control information for instructing a transmission electric power at each of the terminal stations and adjusting transmission energy such that total transmission energy of multiplexed power control information becomes substantially a predetermined value if the total transmission energy of multiplexed power control information is lower than a predetermined threshold value and transmission processing means for multiplexing and transmitting signals processed by the data processing means and the multiplexed power control information processed by the power control information processing means and each of the terminal station which is comprised of measuring means for measuring a receiving situation of a signal transmitted from the base station and transmission processing means for transmitting information of the receiving situation measured by the measuring means by an electric power set based on power control information transmitted from the transmission processing means of the base station.

According to other aspect of the present invention, there is provided a communication method in which a base station and a plurality of terminal stations communicate with each other by radio. This communication method is comprised of the steps of generating power control information for instructing an electric power of a signal transmitted to the base station from the base station to the plurality of terminal stations, adjusting transmission energy such that total transmission energy of multiplexed power control information becomes substantially a predetermined value if the total transmission energy of the multiplexed power control information is lower than a predetermined threshold value, and transmitting the multiplexed power control information from the base station to the plurality of terminal stations.

According to a further aspect of the present invention, there is provided a communication apparatus for communicating with a plurality of terminal stations by radio which is comprised of data processing means for processing data transmitted to each of the terminal stations, power control information processing means for individually generating power control information for instructing transmission electric power at each of the terminal stations and adjusting the transmission energy such that total transmission energy of multiplexed power control information becomes substantially a predetermined value if a total transmission energy of the multiplexed power control information is lower than a predetermined threshold value and transmission processing means for multiplexing and transmitting the multiplexed power control information processed by the data processing means and a signal processed by the power control information processing means.

According to the present invention, when a base station and a plurality of terminal stations are communicated with each other by radio, control information for instructing an electric power of a signal transmitted to the base station are multiplexed from the base station to a plurality of terminals and a transmission energy is adjusted such that the transmission energy becomes substantially a predetermined value if a total transmission energy of the multiplexed power control information is lower than the predetermined value.

According to the present invention, the total transmission energy of the power control information multiplexed and transmitted from the base station is adjusted to become substantially the predetermined value and the transmission state of the power control information becomes satisfactory.

BRIEF DESCRIPTION OF THE DRAWINGS

FIGS. 1A to 1C are explanatory diagrams showing an example of a frame format of down-link from a base station to a terminal station and an example of an electric power distribution according to the related art, respectively;

FIG. 2 (formed of FIGS. 2A and 2B drawn on two sheets of drawings so as to permit a use of a suitably large-scale) is a block diagram showing an example of an entire arrangement of a transmission system of a base station according to the related art;

FIG. 3 (formed of FIGS. 3A and 3B drawn on two sheets of drawings so as to permit a use of a suitably large-scale) is a block diagram showing an example of an overall arrangement of a transmission system according to an embodiment of the present invention;

FIGS. 7A and 7B are explanatory diagrams showing the manner in which electric power of power control information is set (when a new channel is not accepted), respectively;

DESCRIPTION OF THE PREFERRED EMBODIMENT

Figures 4A, 4B:
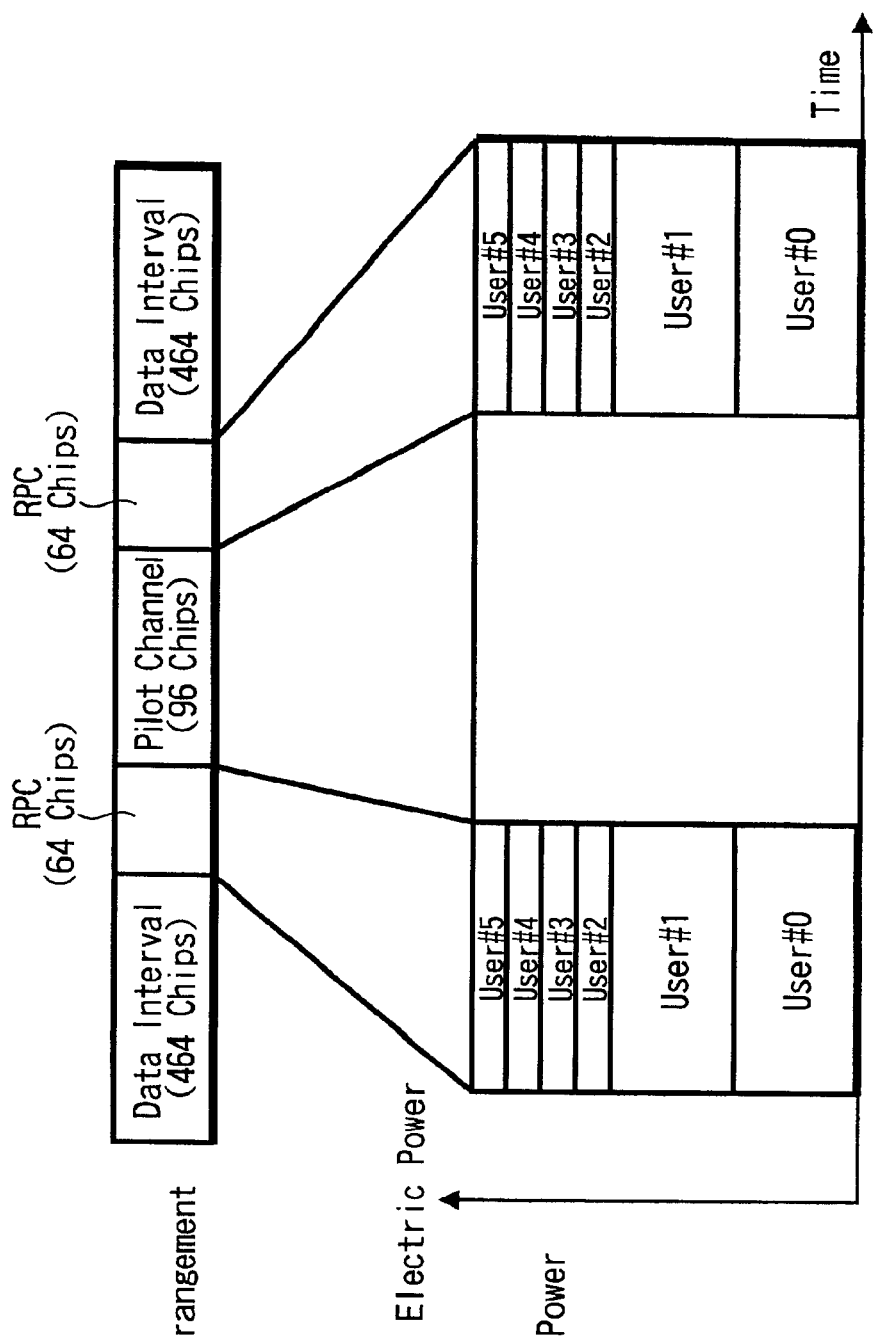
FIGS. 4A and 4B are explanatory diagrams showing an example of a part of a slot arrangement and an example of an electric power distribution, respectively.

A communication system, a communication method and a communication apparatus according to an embodiment of the present invention will be described below with reference to FIGS. 3 to 11. In FIGS. 3 to 11, elements and parts identical to those of FIGS. 1A to 1C and FIG. 2 of the related art are identified with identical reference numerals.

In this embodiment, the present invention is applied to a communication system in which a CDMA system wireless signal is transmitted between the base station and a plurality of terminal stations in a bidirectional fashion. A fundamental slot arrangement used when a down-link signal is transmitted from the base station to each terminal station is the same as that shown in FIG. 1B as the example of the related art. Specifically, under the condition that the down-link transmission from the base station to each terminal station is based on a TDMA (time division multiple access) system with the frame arrangement shown in FIG. 1A and in which one slot is allocated to one terminal station, the power control information transmission interval is applied to an HDR (high data rate) system in which signals to a plurality of terminal stations and which had been spread by using different spread codes for every terminal are multiplexed. In the case of this embodiment, the transmission processing of the power control information within the power control information transmission interval is executed by processings different from those of the related art.

FIG. 3 (formed of FIGS. 3A and 3B drawn on two sheets of drawings so as to permit a use of a suitably large-scale) is a block diagram showing an example of an arrangement of a transmission system of a base station according to this embodiment.

As shown in FIG. 3, transmission data outputted from the transmission data generating section 10 is supplied to the data transmission processing section 14, in which it is processed in a transmission processing fashion such as a coding processing, a modulation processing and an interleave processing. When the transmission data is generated from the transmission data generating section 10, transmission data to a designated terminal station is generated based on control data generated from a control data generating section 28. The control data generating section 28 is adapted to generate control data under control of a channel management section 27. The channel management section 27 is a control section which manages the base station when the base station communicates with a specific terminal station.

When the data transmission processing section 14 processes transmission data, suitable factors such as a coding rate, a modulation system and the number of repeated data are adaptively set based on bit rate information supplied from the data rate control section 15 to the data transmission processing section 14. This data rate control section 15 is adapted to generate bit rate information based on information concerning a communication state transmitted from a terminal station, for example. Information concerning communication states transmitted from respective terminal stations is one which results from converting the reception state (by way of example, a level difference called a CIR between received electric power of a desired wave and received electric power of an interference wave) of the signal into absolute values based on a predetermined conversion table. The following table 1 indicates an example of a relationship among coding rates, modulation systems and the number of repeated data which are set when the data transmission processing section 14 transmits data to the corresponding terminal station based on the information concerning the communication state. The table 1 sets 11 stages of the communication states and shows examples of data rates.

TABLE 1

| Value of Communication state | Measured CIR value | Coding rate | Modulation system | Number of repetitions | Data rate |
|---|---|---|---|---|---|
| 0 | CIR < −7 [dB] | ¼ | QPSK | 16 | 0.03125 [bit/symbol] |
| 1 | −7 [dB] < CIR < −8 [dB] | ¼ | QPSK | 8 | 0.0625 [bit/symbol] |
| 2 | −6 [dB] < CIR < −4 [dB] | ¼ | QPSK | 6 | 0.0833 [bit/symbol] |
| 3 | −4 [dB] < CIR < −3 [dB] | ¼ | QPSK | 4 | 0.1250 [bit/symbol] |
| 4 | −3 [dB] < CIR < −2 [dB] | ¼ | QPSK | 3 | 0.1667 [bit/symbol] |
| 5 | −2 [dB] < CIR < −1 [dB] | ¼ | QPSK | 2 | 0.2500 [bit/symbol] |
| 6 | 1 [dB] < CIR < 3 [dB] | ¼ | QPSK | 1 | 0.5000 [bit/symbol] |
| 7 | 3 [dB] < CIR < 5 [dB] | ⅜ | QPSK | 1 | 0.7500 [bit/symbol] |
| 8 | 5 [dB] < CIR < 9 [dB] | ½ | QPSK | 1 | 1.0000 [bit/symbol] |
| 9 | 9 [dB] < CIR < 12 [dB] | ½ | 8PSK | 1 | 1.5000 [bit/symbol] |
| 10 | 12 [dB] < CIR | ½ | 16QAM | 1 | 2.0000 [bit/symbol] |

In this manner, the data rates are adaptively set in response to the communication states with the respective terminal stations. Then, the transmission data (data of I-channel and data of Q-channel) processed by the data transmission processing section 14 are supplied to the channel multiplex circuit 16.

Power control information supplied from the reception power management section 11 to the power control information input terminals 12a to 12n is information individually prepared for a plurality of terminal stations with which the base station communicates in the same period. For every terminal station, individual information is separately supplied to the input terminals 12a to 12n. Power control information to one terminal station is information of one bit per slot. Such one-bit information is used to instruct the corresponding terminal station such that the corresponding terminal station increases the transmission electric power or decreases the transmission electric power.

Respective power control information obtained by the input terminals 12a to 12n is respectively supplied to power control circuits 31a to 31n and thereby converted into multivalued signals. FIG. 3 shows the case in which respective power control information is converted by the power control circuits 31a to 31n into 2-bit information (2-bit parallel data) per slot in which transmission energy setting bit is added. This transmission energy setting bit is generated based on the bit rate information supplied from the data rate control section 15. To be concrete, when a transmission setting bit rate to the destination terminal station of information handled by the power control circuit of the system is higher than a reference rate, a bit for setting low transmission energy is added to the power control information based on the bit rate information from the data rate control section 15, for example. When on the other hand a transmission setting bit rate to the destination terminal station of information handled by the power control circuit of the system is lower than the reference rate, a bit for setting high transmission energy is added to the power control information.

The power control information with transmission energy setting bits added by the respective power control circuits 31a and 31n are respectively supplied to other direct sequence processing sections 32a to 32n, in which they are converted into data of 4 times in which the same information is repeated 4 times per slot. The power control information converted into the data of 4 times by the respective direct sequence processing sections 32a to 32n are respectively supplied to separate spread processing circuits 33a to 33n, in which it is spread and modulated into data of predetermined times (32 times) by using a predetermined code (e.g., Walsh Code) set at every terminal station and thereby power control information of I-channel and Q-channel are obtained.

The data that had been spread and modulated by the respective spread processing circuits 33a to 33n are supplied to a symbol multiplex circuit 34, in which they are mixed as signals of one system. As a mixing processing executed at that time, the mixing states are adaptively set based on transmission energy set bit information. To be concrete, based on the transmission energy setting bit, there are changed a mixing ratio of power control information instructed to set low a transmission energy and a mixing ratio instructed to set a high transmission energy. Here, the mixing ratio is such one obtained from a signal electric power (amplitude) standpoint.

FIGS. 4A and 4B are respectively diagrams showing examples in which mixing ratios of power control information are set. As shown in FIG. 4A, it is assumed that first and second power control information intervals (RPC) are located ahead of and behind the second pilot interval. Respective data intervals are assumed to be 464 chips, a pilot interval is assumed to be 96 chips, and the first and second power control information intervals are respectively assumed to be 64 chips.

Let it be assumed that power control information should simultaneously be transmitted to six terminal stations of users #0 to #5 in the power control information interval, data to the users #0 and #1 are power control information instructed to set a high transmission energy and data with respect to the remaining users #2 to #5 are power control information instructed to set a low transmission energy. At that time, as shown in FIG. 4B, power control information of the users #0, #1 are mixed in such a manner that they become a signal electric power about twice as large as those of the power control information for other users #2 to #5. When it is instructed that all mixed power control information is mixed at a low mixing ratio or at a high mixing ratio, as a result, the mixing ratios of information become equal to each other.

Referring back to FIG. 3, the power control information mixed into the signal of one system by the symbol multiplex circuit 34 as described above is supplied to the variable gain setting circuit 20. The variable gain setting circuit 20 adjusts the mixed power control information such that the total gain of the mixed power control information becomes substantially a constant value. Specifically, in the case of this embodiment, the gain of the signal transmitted from the base station is a predetermined constant value and the variable gain setting circuit 20 adjusts the gain in such a manner that the output from the symbol multiplex circuit 34 may become constant electric power. Since the gain adjustment is effected on the mixed power control information, mixing ratios (electric power ratios) of amplitudes of power control information for respective users are still those set when power control information are mixed by the symbol multiplex circuit 34.

The variable gain setting circuit 20 adjusts power control information under control of a total RPC power control section 26. Bit rate information is supplied to the total RPC power control section 26 from the data rate control section 15. The total RPC power control section 26 controls power control information with reference to bit rate information. The total RPC power control section 26 communicates with the channel management section 27 and manages the channel setting situation based on the transmitted state of power control information. The situation in which the variable gain setting circuit 20 sets the total gain of the power control information under control of the total RPC power control section 26 will be described later on. The signal whose gain has been adjusted by the variable gain setting circuit 20 is supplied to the channel multiplex circuit 16.

Pilot data obtained by the pilot channel input terminal 13 are all null data and therefore supplied to the channel multiplex circuit 16 as they are.

The channel multiplex circuit 16 multiplexes supplied signals in a time-division manner in a way that a predetermined slot arrangement (slot arrangement shown in FIG. 1B) may be obtained. The power control information supplied from the variable gain setting circuit 20 is multiplexed in such a manner that data of each slot unit is divided into data of first half and data of second half and the data of first half is located in the first power control information interval and the data of the second half is located in the second power control information interval.

The signals thus multiplexed by the channel multiplex circuit 16 in a time-division manner are supplied to the scramble processing circuit 21. This scramble processing circuit 21 is supplied with the spread codes of I-channel and Q-channel set for this base station from the terminals 22i, 22q and spreads the transmission signals by using these spread codes. The transmission signals of the I-channel and Q-channel are supplied to the digital-to-analog (D/A) converter 23, in which they are converted into an analog transmission signal. The analog transmission signal from the D/A converter 23 is supplied to the high-frequency (RF) circuit 24, in which it is converted into a channel signal having a predetermined transmission frequency by a high-frequency signal processing. The converted signal having the above transmission frequency is transmitted from the antenna 25 by radio and thereby transmitted to each terminal station within the area by radio.

Next, the manner in which the transmission electric power of the power control information is controlled and the channel is managed based on the control of the transmission electric power of the power control information within the above base station will be described below. The control of the transmission electric power of the power control information is executed by the variable gain setting circuit 20 under control of the total RPC power control section 26. The total RCP power control section 26 instructs the channel management section 27 in channel management in response to the state in which the power control information is being transmitted at that time.

An example of control of the transmission electric power of the power control information and channel management executed by the total RPC power control section 26 will be described below with reference to a flowchart of FIG. 5 (this example will be referred to as an "example 1").

Figure 5:
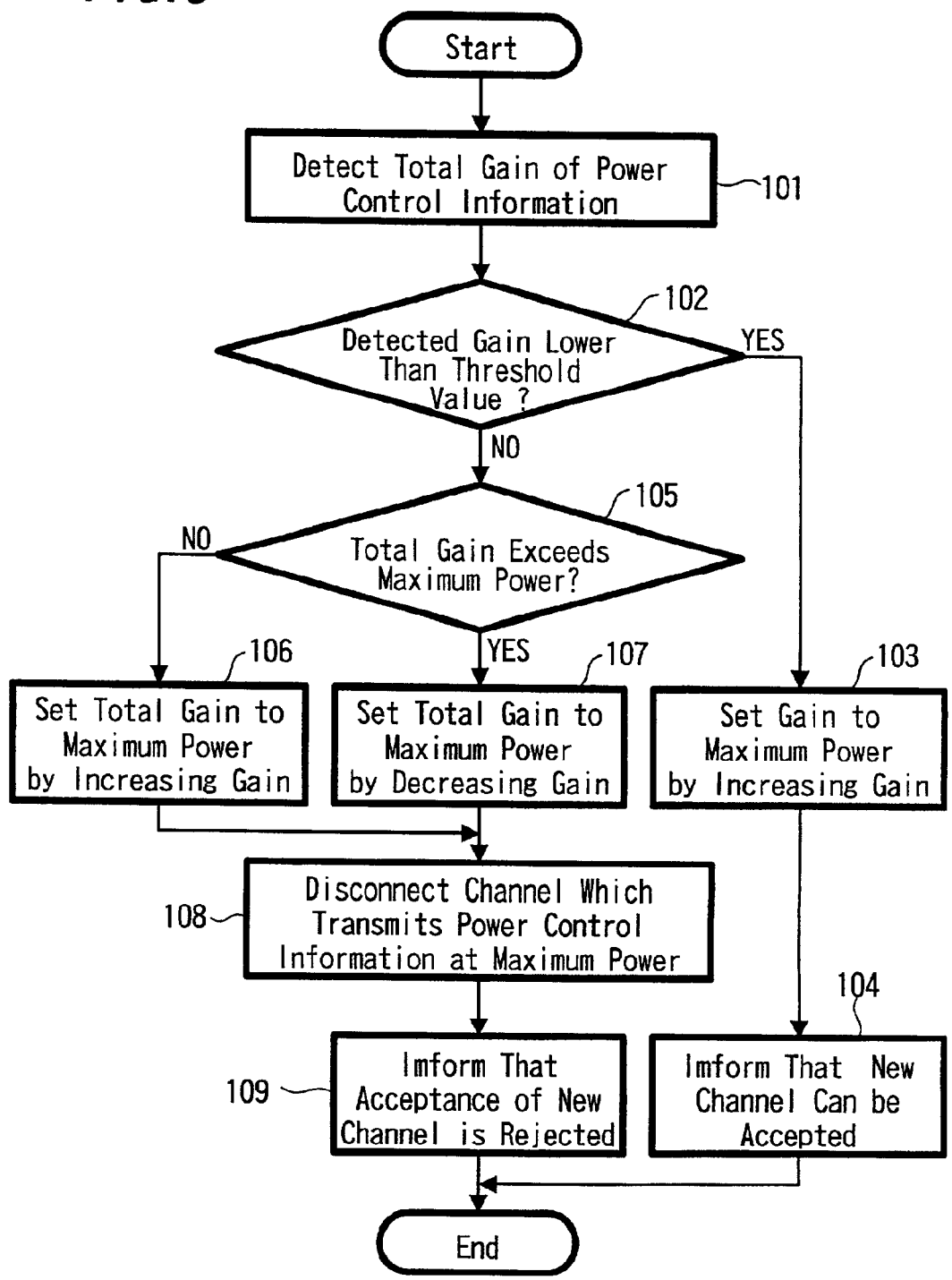
FIG. 5 is a flowchart to which reference will be made in explaining how to control a signal power and the manner in which a new channel is accepted.
Figure 6A:
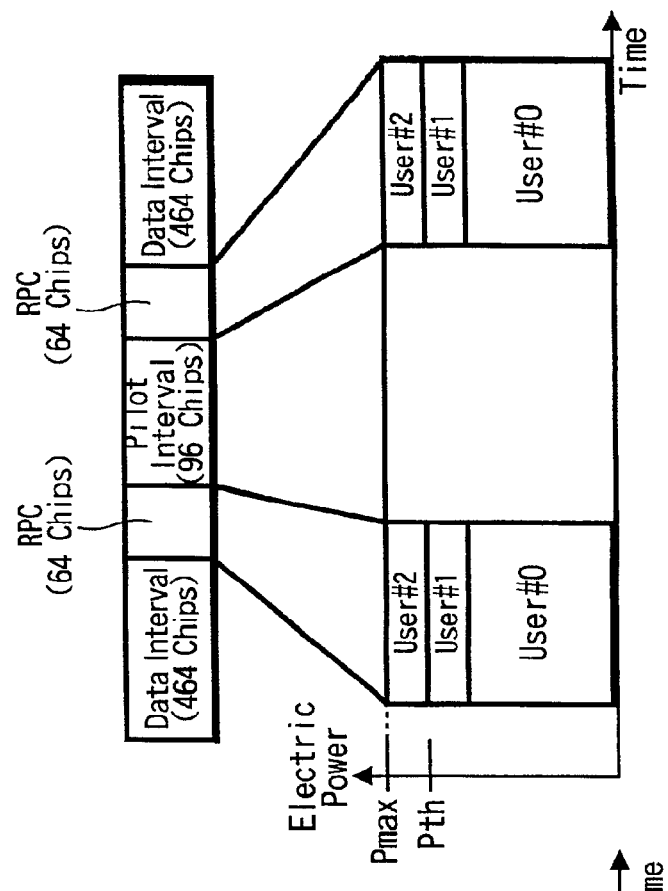
FIGS. 6A and 6B are explanatory diagrams showing the manner in which electric power of power control information is set (when a new channel is accepted), respectively.
Figure 6B:
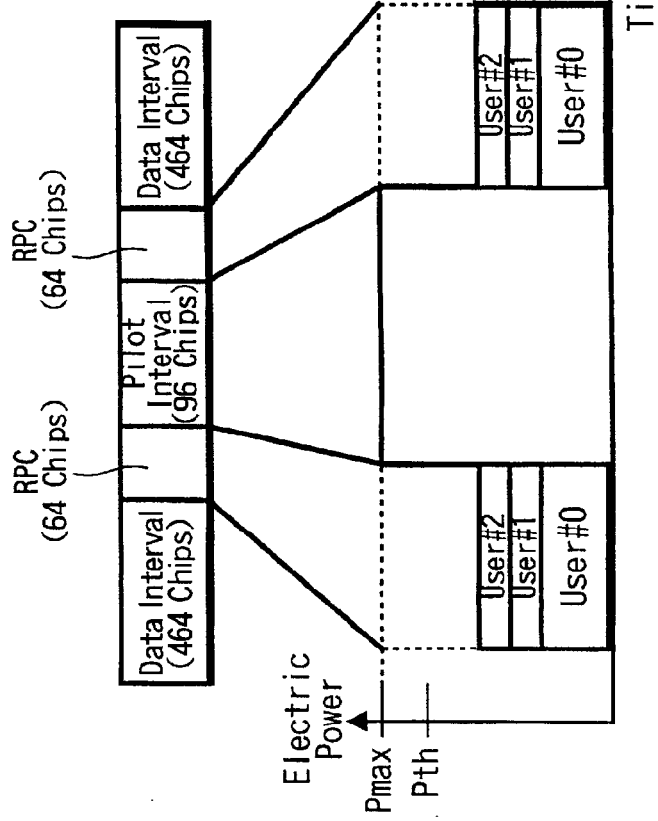

Referring to FIG. 5, and the following the start of operation, at a step 101, the total RPC power control circuit 26 detects a total gain of mixed power control information outputted from the symbol multiplex circuit 34. It is detected at the next decision step 102 whether or not the detected gain is lower than a previously-set threshold value Pth. For example, as shown in FIG. 6A, when a maximum power Pmax of a transmission electric power of power control information is set, the threshold value Pth is set to a value which is about 75% of the maximum power Pmax. The maximum value Pmax corresponds to an output level of power control information adjusted by the variable gain setting circuit 20 and is substantially a maximum electric power which falls within a tolerance range as signals transmitted from this base station, namely the same level as data intervals, pilot intervals etc., for example (or an electric power slightly lower than the maximum electric power).

If the total gain is less than the threshold value Pth as represented by a YES at the decision step 102, then control goes to a step 103, whereat the gain of the signal (power control information) is increased by the variable gain setting circuit 20 and is thereby set to the maximum power Pmax. Then, the transmission signal is transmitted at that maximum power. For example, when the total power judged at the step 102 is lower than the threshold value Pth as shown in FIG. 6A, the total gain is increased by the gain increase processing at the step 103 and is thereby set to the maximum power Pmax and supplied to the circuit of the succeeding stage (channel multiplex circuit 16).

After the step 103 had been executed, control goes to a step 104, whereat the total RPC power control section 26 informs the channel management section 27 of the fact that a new channel can be accepted. The state in which a new channel can be accepted is the state in which when a request for starting a communication between a new terminal station, which is not communicated at present, and the base station is issued within a communication area for communicating this base station by radio, for example, a communication channel can be set between the base station and the requested terminal station.

If on the other hand the total gain is not lower than the threshold value Pth (i.e., the total gain is higher than the threshold value Pth) as represented by a NO at the decision step 102, then control goes to the next decision step 105, whereat it is determined whether or not the total gain obtained at that time exceeds the maximum power Pmax. If the total gain does not exceed the maximum power Pmax as represented by a NO at the decision step 105, control goes to a step 106, whereat the total gain is increased by the variable gain setting circuit 20 and is thereby set to the maximum power Pmax. Then, the transmission signal is transmitted at the maximum power. For example, when the total power judged at the step 105 is lower than the maximum power Pmax and is higher than the threshold value Pth as shown in FIG. 7A, by the gain increasing processing at the step 106, the total gain is increased up to the maximum power Pmax as shown in FIG. 7B and supplied to the circuit of the succeeding stage (channel multiplex circuit 16).

If the total gain exceeds the maximum power Pmax as represented by a YES at the decision step 105, then control goes to a step 107, whereat a gain of a signal (power control information) is decreased by the variable gain setting circuit 20 and is thereby set to the maximum power Pmax. Then, the transmission signal is transmitted at the maximum power.

After the gain of the power control information had been adjusted at the step 106 or 107, control goes to a step 108, whereat a channel which transmits power control information at the largest power is selected from the current channels set for communication with the terminal stations by the base station and the selected channel is disconnected. As shown in FIG. 4B, for example, when the signal for the two terminal stations of the users #0, #1 uses the largest power as an example of an electric power distribution of power control information, either the channel of the signal for the user #0 or the channel of the signal for the user #1 is disconnected.

This channel disconnection processing is executed by an instruction from the total RPC power control section 26 to the channel management section 27. This disconnection is a temporary disconnection processing and the terminal station is being placed in the standby mode until a channel is again allocated and a communication is resumed.

When any one channel is disconnected at the step 108, control goes to a step 109, whereat the total RPC power control section 26 instructs the channel management section 27 of the state in which the acceptance of a new channel should be rejected. The state in which the acceptance of the new channel should be rejected is the state in which when a request for starting a communication between a new terminal station, which is not being communicated with the base station, and the base station is issued within a communication area in which a terminal station is communicated with the base station by radio, the setting of communication channel to such request is rejected.

In this manner, when the management of the total transmission power of the power control information transmitted from the base station and the processing for determining whether or not the new channel is accepted are executed, the base station can set the new channel while maintaining a minimum power state in which the signal from the base station can be received by each terminal station satisfactorily. In the case of this embodiment, the predetermined value in which the total gain is lower than the maximum power Pmax is set to the threshold value Pth. If the gain exceeds the threshold value, then the acceptance of the new channel is rejected so that a margin necessary for communication can be maintained. Specifically, if the threshold value Pth is set to a certain level lower than the maximum power Pmax, for example, then even when the transmission electric power of the power control information transmitted to the terminal station should be increased due to the movement of the position of any terminal station which is now being communicated with the base station, the transmission electric power of the power control information to the corresponding terminal station can be increased so that the communication which is now being executed can be maintained satisfactorily. If the transmission electric power of the power control information should increase very frequently and the total transmission electric power obtained before the power control information is adjusted should exceed the maximum power Pmax, the gain has to be decreased at the step 107.

Let us consider the situation in which the communication area is set in the cell arrangement in which a plurality of base stations are located. If the threshold value Pth is set to a certain level lower than the maximum power Pmax to thereby provide a margin, then when a terminal station, which is now being communicating within the cell comprised of other base stations, is moved into the cell of its own station, the channel for such new terminal station can be set by using such margin, and hence a switching of a communication between the base stations can be executed smoothly. The processing for setting the channel in accordance with the movement of the terminal station from other cell can be regarded as the setting of new channel, and the setting of the new channel can be accepted or rejected based on the processing at the step 104 or 109.

In the example 1 shown in the flowchart of FIG. 5, it is determined at the decision step 105 whether or not the total transmission electric power obtained before the power control information is adjusted exceeds the maximum power Pmax. If it is determined at the decision step 105 that the above total transmission electric power exceeds the maximum power Pmax, then control goes to the step 107, whereat the gain is decreased and set to the maximum power Pmax. The processing for decreasing the gain at the step 107 may not always be executed. Specifically, as shown in a flowchart of FIG. 8 (this example will be referred to as an "example 2"), it is determined at the decision step 105 whether or not the total transmission electric power obtained before the power control information is adjusted exceeds the maximum power Pmax. If it is determined at the decision step 105 that the total transmission electric power exceeds the maximum power Pmax, then control directly goes to a step 108, whereat a processing for disconnecting a channel which uses a largest power to transmit power control information may be executed. Other steps in the flowchart of FIG. 8 are the same as those of the flowchart of the example shown in FIG. 5.

Figure 8:
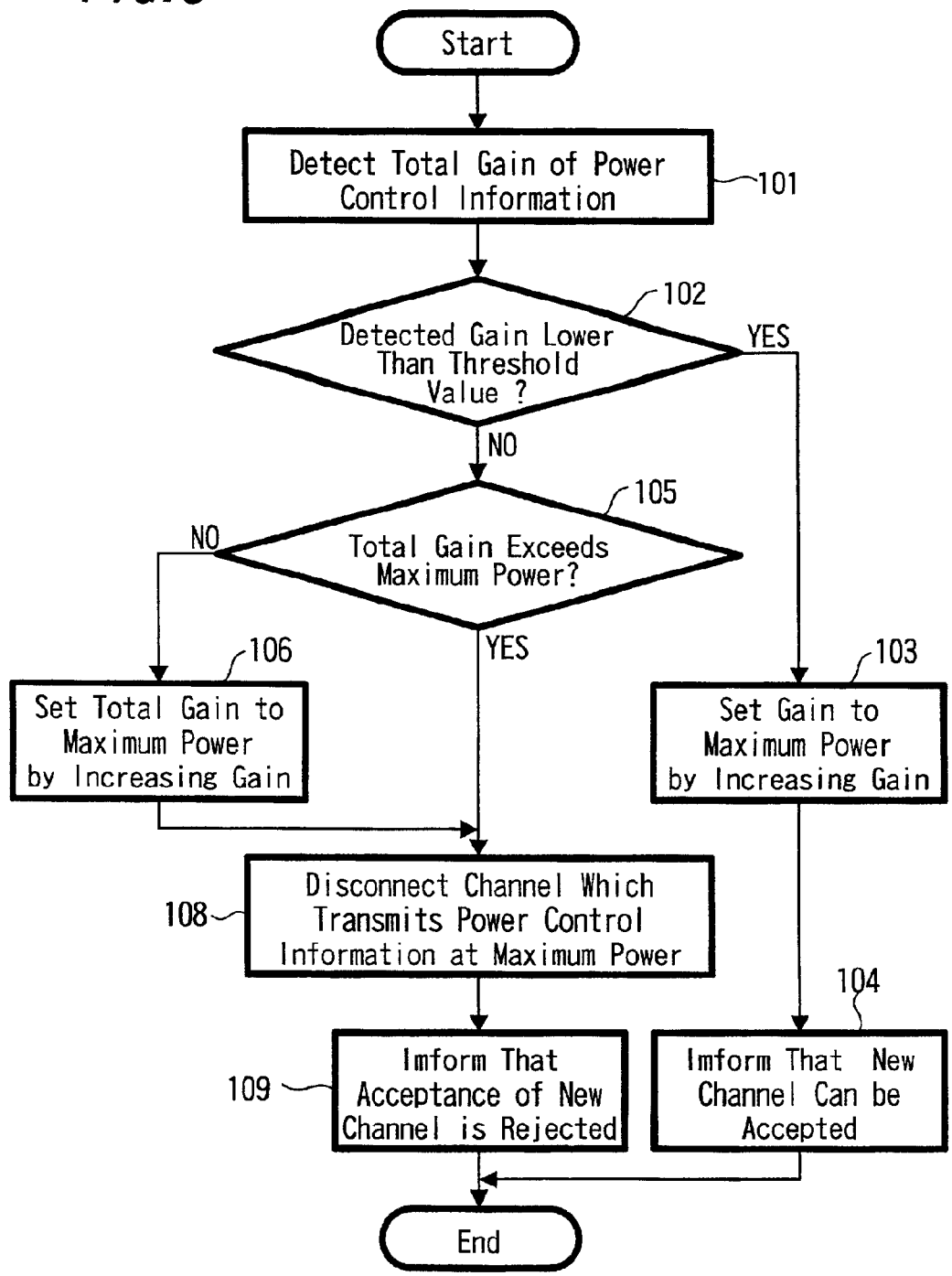
FIG. 8 is a flowchart to which reference will be made in explaining power control and the manner in which a new channel is accepted.

As shown in the flowchart of FIG. 8, if the processing for decreasing the gain is not executed when the total transmission electric power exceeds the maximum power Pmax, there is then the possibility that the total transmission electric power of the power control information will exceed the prescribed maximum power Pmax a little. So long as the power control processing shown in the flowchart of FIG. 8 is executed properly, the total transmission electric power of the power control information rarely exceeds the maximum power Pmax. Even if the total transmission electric power of the power control information exceeds the maximum power Pmax, the level at which the total transmission electric power of the power control information exceeds the maximum power Pmax is very small, which is negligible in actual practice. In particular, when a difference (margin) between the maximum power Pmax and the threshold value Pth is large enough, the total transmission electric power of the power control information never exceeds the maximum power Pmax fundamentally. Hence, the processing in the example 2 shown in the flowchart of FIG. 8 is suitable for the management of channel.

While a disconnected channel is simply selected from the channel (connection) which transmits the power control information at the maximum power when the total transmission electric power exceeds the threshold value as described above, the present invention is not limited thereto, and some priorities may be set to a disconnected channel or a connected channel.

Figure 9:
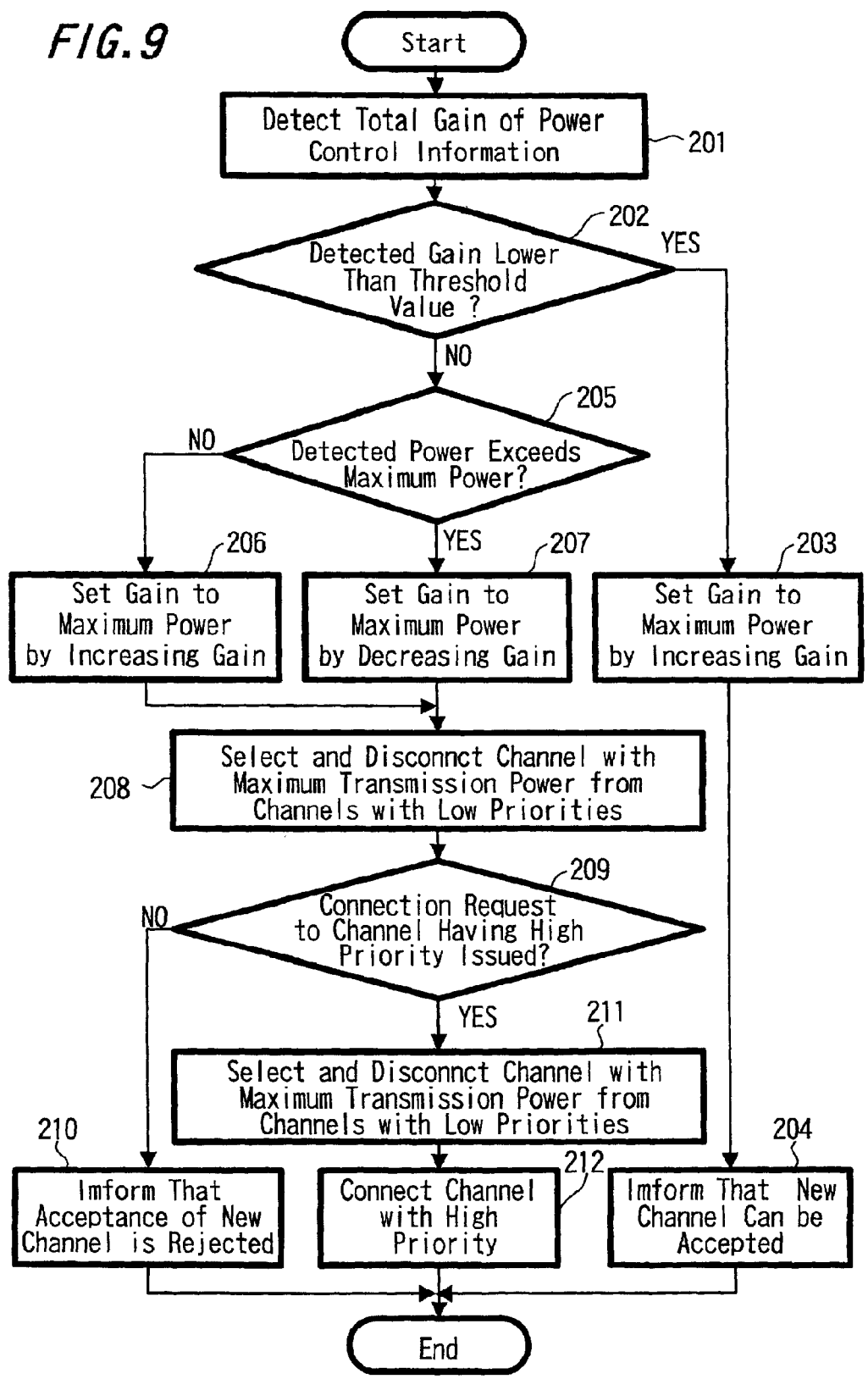
FIG. 9 is a flowchart to which reference will be made in explaining power control and the manner in which a new channel is accepted.

An example shown in a flowchart of FIG. 9 (this example will be referred to as an "example 3") shows an example in which under the condition that priorities are set to terminal stations (connections), control of the transmission electric power of the power control information and the channel management executed by the total RPC power control section 26 are executed. Steps in the flowchart of FIG. 9 will be described below. In the case of this example, let it be assumed that priorities concerning communication are set to respective terminal stations in advance. With respect to the priority, although there may be set two priorities such as a terminal station with a high priority and a terminal station with a low priority, the present invention is not limited thereto and priorities of about 5 stages may be set. Moreover, a priority set to one terminal station is not limited to a fixed value of one kind and a plurality of kinds of priorities may be set at every connection in response to the contents of communication that has been made at that time.

Under the condition that this priority is set to every terminal station, steps in the flowchart of FIG. 9 are executed. Referring to FIG. 9, and following the start of operation, at a step 201, the total RPC power control section 26 detects the total gain of the mixed power control information outputted from the symbol multiplex circuit 34. Then, control goes to the next decision step 202, whereat it is determined whether or not the detected total gain is less than the previously-set threshold value Pth.

If the detected total gain is less than the threshold value Pth as represented by a YES at the decision step 202, control goes to a step 203, whereat the variable gain setting circuit 20 sets the total gain to the maximum power Pmax by increasing the gain of the signal (power control information) and the power control information is transmitted at the maximum power. After the processing at this step 203 had been executed, control goes to a step 204, whereat the total RPC power control section 26 informs the channel management section 27 of the fact that the new channel can be accepted.

If the total gain is not less than the threshold value Pth (i.e., higher than the threshold value Pth) as represented by a NO at the decision step 202, then control goes to the next decision step 205, whereat it is determined whether or not the total gain obtained at that time exceeds the maximum power Pmax. If the total gain is not in excess of the maximum power Pmax as represented by a NO at the decision step 205, then control goes to a step 206, whereat the variable gain setting circuit 20 sets the total gain to the maximum power Pmax by increasing the gain of the signal (power control information) and the power control information is transmitted at the maximum power.

If on the other hand the total gain exceeds the maximum power Pmax as represented by a YES at the decision step 205, then control goes to a step 207, whereat the variable gain setting circuit 20 sets the total gain to the maximum power Pmax by decreasing the gain of the signal (power control information) and the power control information is transmitted at the maximum power.

After the gain had been adjusted at the step 206 or 207, control goes to a step 208, whereat a channel with the lowest priority and whose transmission electric power of power control information is largest is judged from channels with the lowest priority of channels set by the current base station to communicate with terminal stations and one of the judged channels is disconnected.

Control goes to the next decision step 209, whereat it is determined whether or not a terminal station issues a channel connection request with a terminal station with a high priority. If a terminal station does not issue a channel connection request with a terminal station with a high priority as represented by a NO at the decision step 209, control goes to a step 210, whereat the total RPC power control section 26 informs the channel management portion 27 of the rejection of the acceptance of the new channel. If on the other hand a terminal station issues a channel connection request with a terminal station with a high priority as represented by a YES at the decision step 209, control goes to a step 211, whereat channels whose transmission electric power of power control information is largest are judged from channels which are not being set to terminal stations with priorities lower than that of the terminal station which issued the connection request and one of the judged channels is disconnected. Then, control goes to a step 212, at which the channel is set to the terminal station with the high priority judged at the step 209 by using the margin of the disconnected channel.

In this manner, when the total transmission power of the power control information exceeds the threshold value, since the channel is set or disconnected based on the priority set at every terminal station, a terminal station with a higher priority is connected to the base station with a priority. Accordingly, a channel can be rapidly set to a terminal station with a high importance of communication by properly setting priorities in response to an importance of communication.

While the channel is set or disconnected based on the priorities under the condition that transmission electric powers of individual power control information are changed adaptively in the steps of the flowchart shown in FIG. 9, when the transmission electric power of the power control information is made constant, channels may be set or disconnected based on priorities of respective terminal stations.

While priorities are given to terminals themselves in advance as described above, each time the terminal station issues a communication request, a priority may be set in response to the contents of communication and a processing may be executed based on the priority thus set.

Figure 10:
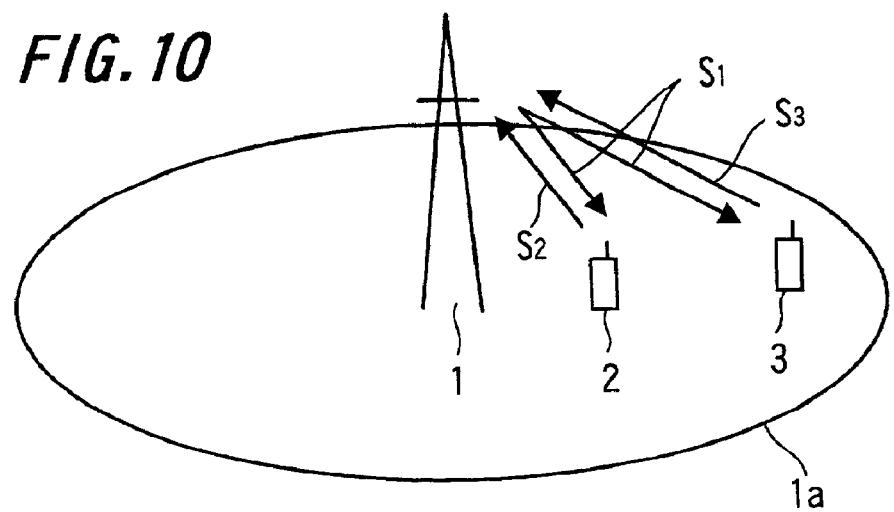
FIG. 10 is an explanatory diagram showing an example of a transmission state according to an embodiment of the present invention.

Next, an example of a transmission state between the base station in which a channel is set or disconnected as described above and each terminal station will be described with reference to FIG. 10. Let it be assumed that a service area 1a in which a base station 1 communicates with terminal stations by radio is set as shown in FIG. 10. Then, terminal stations 2, 3 and the base station 1 are communicating with each other by radio. The terminal stations 2, 3 which had received a down-link signal S1 from the base station 1 measure the receiving situations. For example, the terminal stations 2, 3 judge the receiving states by measuring a received electric field strength and an error rate of received data. The respective terminal stations 2, 3 add data of judged reception states to up-link signals S2, S3 which are to be transmitted to the base station 1.

When receiving the up-link signals S2, S3 from the respective terminal stations 2, 3, the base station 1 sets the transmission processing state of the signal S1 transmitted from the base station 1 on the basis of the data of the reception states contained in the received signals S2, S3, i.e., "values of communication states" on the table 1 and the situations under which the base station 1 is receiving the signals S2, S3. To be concrete, "Values of communication state"=8 is transmitted as the data of the signal S1 reception state at the terminal 2 which is close to the base station 1 so that the reception state better than the reference level is judged. With respect to the reception situation under which the base station 1 is receiving the signal S2 from the terminal station 2, the satisfactory reception state is judged. At that time, the base station 1 sets the coding rate and the modulation system in response to the communication state=8 on the table 1 as the processing in which the data transmission processing section 14 processes data transmitted to the terminal station 2. With respect to the power control information multiplexed to the power control information interval and which is transmitted to the terminal station 2, a mixing ratio at the symbol multiplex circuit 34 is set to be low.

Then, "values of communication state=1" is transmitted as data indicative of the state in which the terminal station 3 distant from the base station 1 and which exists at the peripheral portion of the area 1a is receiving the signal S1 so that the situation in which the base station 1 is receiving the signal S3 from the terminal station 3 is judged as the poor reception state. At that time, the base station 1 sets the coding rate and the modulation system in response to the communication state=1 on the table 1 as the processing in which the data transmission processing section 14 processes the data transmitted to the terminal station 3. With respect to the power control information multiplexed to the power control information interval and which is transmitted to the terminal station 3, its mixing ratio at the symbol multiplex circuit 34 is set to be high.

In this manner, the power control information are transmitted to the respective terminal stations 2, 3, whereby the respective terminal stations 2, 3 can receive power control information satisfactorily. Accordingly, the respective terminal stations 2, 3 can correctly judge the contents of the power control information wherever the respective terminal stations 2, 3 are located in the area 1a and can correctly set the transmission electric power as they are instructed from the base station 1.

Data of power control information is 1-bit data for increasing or decreasing a transmission electric power, and is set based on whether an electric power at which the base station 1 receives the signals S2, S3 is higher than or lower than the reference level. When receiving their own power control information, the respective terminal stations 2, 3 execute the processing for changing the transmission electric power to the state instructed by that power control information (i.e., increasing or decreasing a transmission electric power). When the power control information is transmitted from the base station 1 to the terminal stations 2, 3, the base station 1 can receive the signal at the receiving electric power of substantially constant level regardless of the position at which the signal is transmitted within the area 1a. Thus, the base station can avoid the reception level from being fluctuated due to a distance between the base station and the terminal station.

Figure 11:
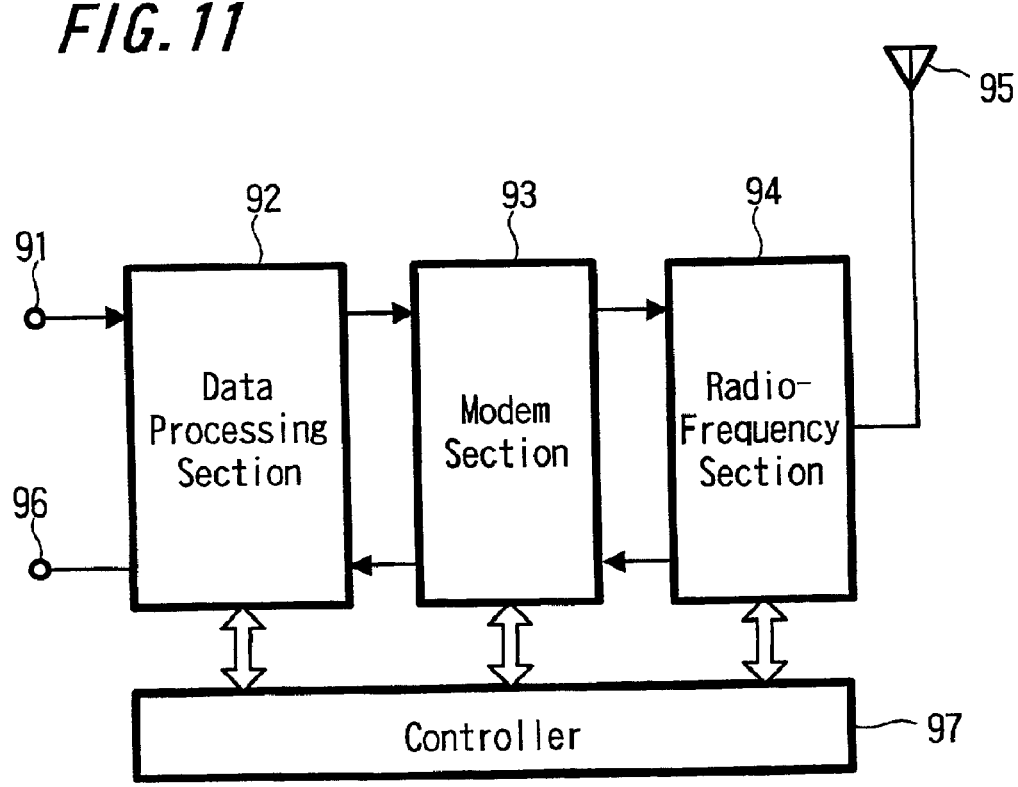
FIG. 11 is a block diagram showing an example of an arrangement of a terminal station according to an embodiment of the present invention.

FIG. 11 schematically shows an example of a concrete arrangement of the terminals stations 2, 3. First, the arrangement of the transmission system of the terminal station will be described. As shown in FIG. 11, transmission data applied to an input terminal 91 is supplied to a data processing section 92, in which it is converted into data of transmission slot arrangement. Then, the data of the transmission slot arrangement is supplied to a modem (modulator and demodulator) section 93, in which it is modulated into transmission modulated data. This transmission modulated data is supplied to a radio-frequency (high-frequency) section 94, in which it is frequency-converted into a signal of a predetermined transmission channel and transmitted from an antenna 95 by radio.

An arrangement of a receiving system of the terminal station will be described below. A signal of a predetermined transmission channel is received at the antenna 95 connected to the radio-frequency section 94. Then, the received signal is modulated by the modem section 93 and supplied to the data processing section 92, in which data is extracted from reception slot obtained by the modulation and the extracted data is outputted from an output terminal 96. A data processing apparatus such as a personal computer is connected to the input terminal 91 and the output terminal 96. Data processing at the data processing section 92, the modulation and demodulation processing at the modem section 93 and the high-frequency processing at the radio-frequency section 94 are executed under control of a controller 97.

With the above arrangement of the terminal station, the judgment of the receiving situation of the down-link signal is executed by the controller 97 when the controller 97 judges the reception electric power at the radio-frequency section 94, the data error rate at the data processing section 92, or the like. The data of the judged receiving situation is added to transmission data processed by the data processing section 92. The power control information transmitted from the base station is extracted by the data processing section 92 and supplied to the controller 97, and the controller 97 sets a corresponding transmission electric power by controlling an amplification factor of an amplifier provided within the radio-frequency section 94, or the like.

While the transmission electric power of the power control information is controlled in two stages as described above, according to this embodiment, information concerning the communication state are obtained from the terminal station in the form of information of 11 stages so that the transmission electric power (amplitude) of the control information may be more finely controlled (converted into multivalued data). Examples of such control are illustrated on the following table 2. An example 1 on this table 2 shows an example of control of 2 stages of the amplitude (electric power) (i.e., control corresponding to the processing at the above embodiment), and examples 2 to 5 show controls of 11 stages.

In the case of the examples 2 and 3, outputs of the power control circuits 31a to 31n should be 8-bit data. In the case of the examples 4 and 5, outputs of the power control circuits 31a to 31n should be 6-bit data, respectively.

TABLE 2

| Value of communication state | Reported data rate | Absolute value of amplitude power information | | | | |
|---|---|---|---|---|---|---|
| | | Example 1 | Example 2 | Example 3 | Example 4 | Example 5 |
| 0 | 0.03125 [bit/symbol] | 2 | 127 | 127 | 31 | 31 |
| 1 | 0.0625 [bit/symbol] | 2 | 90 | 90 | 22 | 22 |
| 2 | 0.0833 [bit/symbol] | 2 | 78 | 78 | 20 | 20 |
| 3 | 0.1250 [bit/symbol] | 2 | 64 | 64 | 16 | 16 |
| 4 | 0.1667 [bit/symbol] | 2 | 55 | 55 | 14 | 14 |
| 5 | 0.02500 [bit/symbol] | 1 | 45 | 45 | 12 | 12 |
| 6 | 0.5000 [bits/symbol] | 1 | 32 | 32 | 8 | 8 |
| 7 | 0.7500 [bit/symbol] | 1 | 26 | 26 | 7 | 7 |
| 8 | 1.000 [bit/symbol] | 1 | 23 | 20 | 6 | 5 |
| 9 | 1.5000 [bit/symbol] | 1 | 19 | 13 | 5 | 4 |
| 10 | 2.0000 [bit/symbol] | 1 | 16 | 10 | 4 | 3 |

When the transmission electric power of the power control information is controlled finely as described above, the power control information can transmitted to each terminal station more satisfactorily. In the case of the example 1 shown on the table 2, since the step of the transmission electric power control is 6 [dB], the multivalued signals can easily be generated from the power control circuits 31a to 31n by shifting the bits. The values of the amplitudes shown on the table 2 show examples of relative ratios between the reported data rates. Values substantially similar to the ratios shown on the table 2 are suitable values and are not limited to the values shown on the table 2.

While the communication states such as the encoding ratio, the modulation system and the number of repetitions are determined with reference to the table based on the table 1 from the values of the measured communication states (CIR values in the above example) in the processing shown on the above table 1, these communication processing states may be obtained by a calculation processing using a predetermined function from the measured communication state values. With respect to the processing shown on the table 2, while the absolute values of the amplitudes of the power control information are determined with reference to the table based on the table 2 from the reported data rates, the present invention is not limited thereto and the absolute values of the amplitudes of the power control information may be determined by a calculation processing using a predetermined function from the reported data rates.

While the present invention is applied to the slot arrangement in which the power control information intervals are located ahead of and behind the pilot interval as described above, the present invention is not limited thereto and can be applied to other slot arrangements. For example, a similar processing can be applied to the case in which only one power control information interval is located at one slot.

While the present invention is applied to the case in which the power control information are individually transmitted from the base station to the respective terminal stations as described above, the present invention is not limited thereto and other information that should be individually transmitted to the respective terminal stations may be transmitted in a similar processing. When the power control information is transmitted, the power control information is not limited to the information which instructs the increase or decrease of the transmission power described in the above embodiment and may be information which issues a more detailed instruction.

While the transmission energy of the power control information is adaptively set at every terminal station as described above, the present invention is not limited thereto. That is, under the condition that the transmission energies of the power control information to the respective terminal stations are set to be equal, even when the number of channels is changed in accordance with the number of terminal stations which communicate with the base station, the total transmission energies are adjusted to become equal to each other and the steps on the above flowchart may be executed.

The numerical values described in the above embodiment show examples by way of example and are not limited to the above examples. When the transmission energy is set based on the maximum power Pmax and the threshold value Pth, the transmission electric power is not strictly matched with the maximum value Pmax and the transmission electric power may fall within a certain range based on the maximum value Pmax, for example.

While the coding rate, the modulation system and the number of repeated data at the data transmission processing section 14 which is the data processing means are adaptively set based on the bit rate information outputted from the data rate control section 15 and the processing of the power control information at the power control circuits 31a to 31n which are the power control information processing means are set adaptively in the concrete example of the above embodiment, the present invention is not limited thereto, and the adaptive setting at the data transmitting means and the adaptive setting at the power control information processing means may be executed based on other communication state information.

While the processing described in the above embodiment is applied to the TDMA system in which one slot is allocated to one connection as the frame arrangement and the data transmission system called the HDR system in which only the power control information transmission interval within each slot is multiplexed by the CDMA system, the processing arrangement of the present invention is not limited thereto and can be applied to other transmission systems. For example, other intervals than the power control information transmission interval may be multiplexed by the CDMA system. Moreover, when signals other than the CDMA system are transmitted by radio, the processing arrangement according to the present invention can be applied.

According to the present invention, the total transmission energy of the power control information multiplexed and transmitted from the base station is adjusted so as to become substantially the predetermined value, and hence the transmission state of the power control information become satisfactory. Specifically, when the total transmission energy of the power control information, for example, is adjusted such that it becomes the allowable maximum value, the transmission of individual power control information to the respective terminal stations can be maintained in the most satisfactory state at the very tolerance. Hence, it becomes possible to reliably transmit the power control information to each terminal station.

In this case, when the total transmission energy obtained before the multiplexed power control information is adjusted is higher than the predetermined threshold value, the setting of the connection with the new terminal station is rejected. Hence, when there is no margin in the transmission of the power control information, the new channel can be prevented from being set and the transmission energy of individual power control information can be prevented from being decreased by the setting of the new channel. Therefore, the satisfactory transmission state of the power control information to individual terminal stations can be maintained.

When the setting of the connection with the new terminal station is rejected, if the terminal station which has the new connection setting request has the terminal station having the high priority, then the connection with the terminal station having the low priority is forced to end and the connection with the terminal station having the high priority is set. Thus, without degrading the communication quality, the communication between the base station and the terminal station can be set satisfactorily with the priority based on the previously-determined priority.

In the above case, when the total transmission energy obtained before the multiplexed power control information is adjusted is higher than the predetermined threshold value, the connection with any terminal station currently accommodated is forced to end, whereby the communication with a certain margin can constantly be made and the base station can satisfactorily communicate with individual terminal stations. For example, when the transmission energy of the power control information should be increased between the base station and any one terminal station which is being communicated with the base station, the communication has the margin obtained by the above processing. Therefore, even when the transmission energy is set to be large in that system, the transmission energies of individual systems can be set so as to fall within a proper range.

Further, when the connection with any terminal station which is now being accommodated is forced to end, the transmission energies of the power control information to the respective terminal stations are adaptively and individually set at every terminal station and multiplexed. Then, since the connection which is forced to end is selected from the connections in which the transmission energies are set to be large, it becomes possible to maintain relatively large margin which is obtained by forcing the connection to end.

Furthermore, when the connection with any terminal station which is now being accommodated is forced to end, the connection which is forced to end is selected from the connection whose previously-determined priority is low. Therefore, when the high priority is set in advance to the terminal station in which a communication with a high importance is executed, the communication with the high importance can be maintained in the satisfactory state.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A communication system in which a base station and a plurality of terminal stations communicate by radio, comprising:
   a base station having:
   data processing means for processing data transmitted to each of said plurality of terminal stations;
   power control information processing means for generating power control information for controlling a transmission of electric power at each of said terminal stations and adjusting a transmission energy such that a total transmission energy of multiplexed power control information becomes substantially a predetermined value when said total transmission energy of multiplexed power control information is lower than a predetermined threshold value; and
   transmission processing means for multiplexing and transmitting signals processed by said data processing means and said multiplexed power control information processed by said power control information processing means; and
   said plurality of terminal stations each have:
   measuring means for measuring a communication state of a signal transmitted from said base station; and
   transmission processing means for transmitting information on said communication state measured by said measuring means by electric power controlled based upon said power control information transmitted from said transmission processing means of said base station,
   wherein said base station includes communication connection setting means for rejecting a setting of a connection with each of said plurality of terminal stations when said total transmission energy obtained before said power control information multiplexed by said power control information processing means of said base station is adjusted is higher than said predetermined threshold value.

2. The communication system according to claim 1, wherein said communication connection setting means forces a connection with a low priority to end and sets a connection with a high priority when it is determined by said communication connection setting means that another connection requested to be set has a high priority.

3. A communication system in which a base station and a plurality of terminal stations communicate by radio, comprising:
   a base station having:
   data processing means for processing data transmitted to each of said plurality of terminal stations;
   power control information processing means for generating power control information for controlling a transmission of electric power at each of said terminal stations and adjusting a transmission energy such that a total transmission energy of multiplexed power control information becomes substantially a predetermined value when said total transmission energy of multiplexed power control information is lower than a predetermined threshold value;
   transmission processing means for multiplexing and transmitting signals processed by said data processing means and said multiplexed power control information processed by said power control information processing means; and
   said plurality of terminal stations each have:
   measuring means for measuring a communication state of a signal transmitted from said base station; and
   transmission processing means for transmitting information on said communication state measured by said measuring means by electric power controlled based upon said power control information transmitted from said transmission processing means of said base station,
   wherein said base station includes communication connection setting means for forcing an end of a connection with any currently accommodated one of said terminal stations when said total transmission energy obtained before said power control information multiplexed by said power control information processing means of said base station is adjusted is higher than said predetermined threshold value.

4. The communication system according to claim 3, wherein said power control information processing means adaptively sets and multiplexes said transmission energy of power control information of said terminal stations for each of said plurality of terminal stations and said connection forced to end by said communication connection setting means is selected from among connections whose transmission energy is set large by said power control information processing means.

5. The communication system according to claim 3, wherein said connection forced to end by said communication connection setting means is selected from among a predetermined group of connections with a low priority.

6. A communication method in which a base station and a plurality of terminal stations communicate by radio, comprising the steps of:
   generating power control information for controlling electric power for a signal transmitted to said base station from said plurality of terminal stations;
   adjusting transmission energy such that a total transmission energy of multiplexed power control information becomes substantially a predetermined value when said total transmission energy of said multiplexed power control information is lower than a predetermined threshold value;

transmitting said multiplexed power control information from said base station to said plurality of terminal stations; and rejecting a setting of a connection with one of said terminal stations when said total transmission energy obtained before said multiplexed power control information is adjusted is higher than said predetermined threshold value.

7. The communication method according to claim 6, further comprising the step of forcing a connection with a low priority to end and setting a connection with a high priority when a priority of another connection requested to be set is high.

8. A communication method in which a base station and a plurality of terminal stations communicate by radio, comprising the steps of:

generating power control information for controlling electric power for a signal transmitted to said base station from said plurality of terminal stations;

adjusting transmission energy such that a total transmission energy of multiplexed power control information becomes substantially a predetermined value when said total transmission energy of said multiplexed power control information is lower than a predetermined threshold value;

transmitting said multiplexed power control information from said base station to said plurality of terminal stations; and forcing an end of a connection with any currently accommodated said terminal stations when said total transmission energy obtained before said multiplexed power control information is adjusted is higher than said predetermined threshold value.

9. The communication method according to claim 8, further comprising the steps of:

adaptively setting and multiplexing transmission energy of power control information toward said plurality of terminal stations for each of said plurality of terminal stations individually; and selecting said connection forced to end from a connection group in which transmission energies are set large.

10. The communication method according to claim 8, further comprising the step of selecting said connection forced to end from among a predetermined group of connections with a low priority.

11. A communication apparatus for communicating with a plurality of terminal stations by radio, comprising:

data processing means for processing data transmitted to each of said terminal stations;

power control information processing means for individually generating power control information for controlling transmission electric power at each of said terminal stations and adjusting a transmission energy such that a total transmission energy of multiplexed power control information becomes substantially a predetermined value when said total transmission energy of said multiplexed power control information is lower than a predetermined threshold value;

transmission processing means for multiplexing and transmitting a signal processed by said data processing means and said multiplexed power control information processed by said power control information processing means; and communication connection setting means for rejecting a setting of a connection with another terminal station when said total transmission energy obtained before said power control information multiplexed by said power control information processing means is adjusted is higher than said predetermined threshold value.

12. The communication apparatus according to claim 11, wherein said communication setting means forces an end of a connection with a low priority and sets a connection with a high priority when it is determined by said communication connection setting means that a priority of a requested connection is high.

13. A communication apparatus for communicating with a plurality of terminal stations by radio, comprising:

data processing means for processing data transmitted to each of said terminal stations;

power control information processing means for individually generating power control information for controlling transmission electric power at each of said terminal stations and adjusting a transmission energy such that a total transmission energy of multiplexed power control information becomes substantially a predetermined value when said total transmission energy of said multiplexed power control information is lower than a predetermined threshold value;

transmission processing means for multiplexing and transmitting a signal processed by said data processing means and said multiplexed power control information processed by said power control information processing means; and communication connection setting means for forcing an end of a connection with any currently accommodated terminal stations when said total transmission energy obtained before said power control information multiplexed by said power control information processing means is adjusted is higher than said predetermined threshold value.

14. The communication apparatus according to claim 13, wherein said power control information processing means adaptively sets and multiplexes said transmission energy of power control information toward each of said plurality of terminal stations individually and said connection forced to end by said communication connection setting means is selected from among connections in which transmission energy is set large by said power control information processing means.

15. The communication apparatus according to claim 13, wherein said connection forced to end by said communication connection setting means is selected from among a predetermined group of connections with a low priority.

* * * * *